US008825602B1

(12) United States Patent
Desai et al.

(10) Patent No.: US 8,825,602 B1
(45) Date of Patent: Sep. 2, 2014

(54) SYSTEMS AND METHODS FOR PROVIDING DATA PROTECTION IN OBJECT-BASED STORAGE ENVIRONMENTS (75) Inventors: Samir Desai, Pune (IN); Niranjan Pendharkar, Pune (IN); Ganesh Varadarajan, Pune (IN)

(73) Assignee: Symantec Corporation, Mountain View, CA (US)

( * ) Notice: Subject to any disclaimer, the term of this patent is extended or adjusted under 35 U.S.C. 154(b) by 702 days.

(21) Appl. No.: 12/724,198

(22) Filed: Mar. 15, 2010

(51) Int. Cl.
*G06F 7/00* (2006.01)
*G06F 17/00* (2006.01)

(52) U.S. Cl.
USPC .......................................... 707/646; 707/649

(58) Field of Classification Search
CPC .......... G06F 17/30088; G06F 11/1446; G06F 11/1451
USPC ......... 707/609, 610, 624, 625, 639, 640, 644, 707/646, 649, 641
See application file for complete search history.

(56) References Cited

U.S. PATENT DOCUMENTS

| 5,721,919 | A | * | 2/1998 | Morel et al. | 395/619 |
| 5,835,953 | A | * | 11/1998 | Ohran | 711/162 |
| 6,535,891 | B1 | * | 3/2003 | Fisher et al. | 707/203 |
| 6,988,137 | B2 | * | 1/2006 | Wu | 709/224 |
| 7,177,993 | B1 | * | 2/2007 | Kiselev et al. | 711/162 |
| 7,243,089 | B2 | * | 7/2007 | Becker-Szendy et al. | 707/1 |
| 7,290,018 | B2 | * | 10/2007 | Muecklich et al. | 707/624 |
| 7,308,545 | B1 | * | 12/2007 | Kekre et al. | 711/162 |
| 7,529,780 | B1 | * | 5/2009 | Braginsky et al. | 707/203 |
| 7,562,077 | B2 | * | 7/2009 | Bisson et al. | 707/4 |
| 7,606,881 | B2 | * | 10/2009 | Chasman et al. | 709/221 |
| 7,882,064 | B2 | * | 2/2011 | Lee et al. | 707/625 |
| 8,055,613 | B1 | * | 11/2011 | Mu et al. | 707/610 |
| 2006/0136472 | A1 | * | 6/2006 | Jujjuri et al. | 707/102 |
| 2006/0288047 | A1 | * | 12/2006 | Chron et al. | 707/200 |
| 2008/0270461 | A1 | * | 10/2008 | Gordon et al. | 707/103 R |
| 2009/0210454 | A1 | * | 8/2009 | Sagar et al. | 707/201 |

OTHER PUBLICATIONS

Jin Xiong, et al; Improving data availability for a cluster file system through replication; http://ieeexplore.ieee.org/application/enterprise/entconfirmation.jsp?arnumber=4536154, as accessed on Feb. 26, 2010, 1 pp.
Peter J. Braam, et al; Object based Storage Cluster File Systems & Parallel I/O; http://docs.huihoo.com/lustre/Obdcluster.pdf, as accessed on Feb. 26, 2010, 44 pages.
Harjinder S. Sandhu, et al.; Cluster-based file replication in large-scale distributed systems; http://portal.acm.org/citation.cfm?id=149439.133092, as accessed on Feb. 26, 2010, 2 pages.

* cited by examiner

*Primary Examiner* — Marc Somers
(74) *Attorney, Agent, or Firm* — ALG Intellectual Property, LLC (57) ABSTRACT

A method for providing data protection in object-based storage environments may include: 1) taking a first snapshot, at a first time, of a set of partitions that store data of a file system on a set of object storage devices; 2) using the first snapshot to sync the data of the file system with a data protection node; 3) taking a second snapshot, at a second time, of the set of partitions; 4) using information from the set of object storage devices to identify at least one object that changed between the first and second times; 5) using object identification information to deduce file identification information that identifies a file that comprises the changed object; and 6) sending the changed object and the file identification information to the data protection node. Various other methods, systems, and computer-readable media are also disclosed.

20 Claims, 6 Drawing Sheets

SYSTEMS AND METHODS FOR PROVIDING DATA PROTECTION IN OBJECT-BASED STORAGE ENVIRONMENTS

BACKGROUND

Computer systems frequently include data storage subsystems for storing data. In particular, computer systems that include multiple clients interconnected by a network increasingly share one or more data storage subsystems via a network. The data storage subsystems may include or be further coupled to storage consisting of one or more disk storage devices, tape drives, or other storage media. A computer system may also include one or more servers in which metadata associated with the contents of the included storage devices is maintained. Such systems may store data in objects and may be referred to as object-based storage systems.

In object-based storage systems, a file system of a client may write directly to object storage devices after accessing metadata in a metadata server. For such systems, a traditional approach to implementing periodic replication may include using the file system to take snapshots at pre-decided intervals of time. Changes identified in the snapshots may then be transferred to a remote replication node. Unfortunately, since such replication algorithms use metadata from the metadata server to create snapshots, some changed data may not be replicated. For example, if a client makes a change to data, and the client does not update the data's information on the metadata server before a snapshot is taken, the change may be missed. Furthermore, traditional replication algorithms may introduce significant additional load on a metadata server. What is needed, therefore, is a more efficient and effective mechanism for protecting data in object-based-storage environments.

SUMMARY

As will be described in greater detail below, the instant disclosure generally relates to systems and methods for providing data protection in object-based storage environments. In some embodiments, a computer-implemented method for providing data protection in object-based storage environments may include: 1) taking a first snapshot, at a first time, of a set of partitions that store data of a file system on a set of object storage devices; 2) using the first snapshot to sync the data of the file system with a data protection node; 3) taking a second snapshot, at a second time, of the set of partitions that store data of the file system on the set of object storage devices; 4) using information from the set of object storage devices to identify at least one object that changed between the first and second times; 5) using object identification information for the changed object to deduce file identification information that identifies a file that comprises the changed object; and 6) sending the changed object and the file identification information to the data protection node.

In various embodiments, the method may also include retrieving metadata for the set of object storage devices from a set of metadata servers, determining that the metadata has not been updated to reflect the change to the changed object, and waiting for the metadata to be updated to reflect the change to the changed object before applying the changed object to a file system on the data protection node. Additionally or alternatively, the method may include retrieving namespace metadata of the file system from a set of metadata servers and using the metadata to identify changes made to the namespace of the file system between the first and second times.

Using the metadata to identify changes made to the namespace may include using a file change log in the metadata to identify changes made to the namespace. In other embodiments, using the metadata to identify changes made to the namespace may include: 1) mounting the first and second snapshots; 2) performing namespace traversal of the first snapshot to provide a representation of the namespace at the first time; 3) performing namespace traversal of the second snapshot to provide a representation of the namespace at the second time; and 4) comparing the representation of the namespace at the first time with the representation of the namespace at the second time to identify changes made to the namespace.

According to various embodiments, using the information from the set of object storage devices to identify the changed object may include determining whether a timestamp of the object changed between the first and second times. In certain embodiments, using the information from the set of object storage devices to identify the changed object may include identifying a change log for each object storage device in the set of object storage devices and determining that the change log identifies the changed object.

In some embodiments, the object identification information may include: 1) a partition identifier that identifies a partition of the changed object and comprises file system identification information of the object; 2) an object identifier that identifies the changed object and comprises an inode number of a file that includes the changed object; and 3) an attribute field that includes offset information that identifies the changed object's offset within the file. In such embodiments, using object identification information for the changed object to deduce file identification information may include reading the file system identification information, the inode number, and the offset from the object identification information.

In various embodiments, using object identification information for the changed object to deduce file identification information may include reading a table that maps the object identification information to the file identification information.

According to certain embodiments, the file is two-way mirrored, mirroring information for the file is stored with the object identification information, and the mirroring information is used to prevent duplication of a data operation on the file. In at least one embodiment, the remote data-protection node may include a data-replication node, and sending the changed object and the file identification information to the data protection node may include replicating the data on the data protection node.

A system for data protection in object-based storage environments may include: 1) a snapshot module programmed to take a first snapshot, at a first time, of a set of partitions that store data of a file system on a set of object storage devices and take a second snapshot, at a second time, of the set of partitions that store data of the file system on the set of object storage devices; 2) a reverse-mapping module programmed to use information from the set of object storage devices to identify at least one object that changed between the first and second times and to use object identification information for the changed object to deduce file identification information that identifies a file that comprises the changed object; and 3) a data protection module programmed to use the first snapshot to sync the data of the file system with a data protection node and send the changed object and the file identification information to the data protection node. The system may also include at least one processor configured to execute the snapshot module, the reverse-mapping module, and the data protection module.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for providing data protection in object-based storage environments. Embodiments of the instant disclosure may use change-tracking information on object storage devices and a reverse mapping from objects to files in a file system to provide efficient and effective data protection (e.g., data replication, data backup, etc.). For example, some object-based-storage systems may store file system identifiers, inode numbers, and file offset information with object identification information (e.g., partition identifiers, object identifiers, and/or attribute fields). Such file system information stored with object identification information may be used to reverse map an object to a corresponding file in a file system. File system identification information deduced by reverse mapping may be sent, along with corresponding changed data objects, to a remote node for replication or any other data protection function. In this manner, embodiments of the instant disclosure may provide distributed replication and other data protection services.

Figure 1:
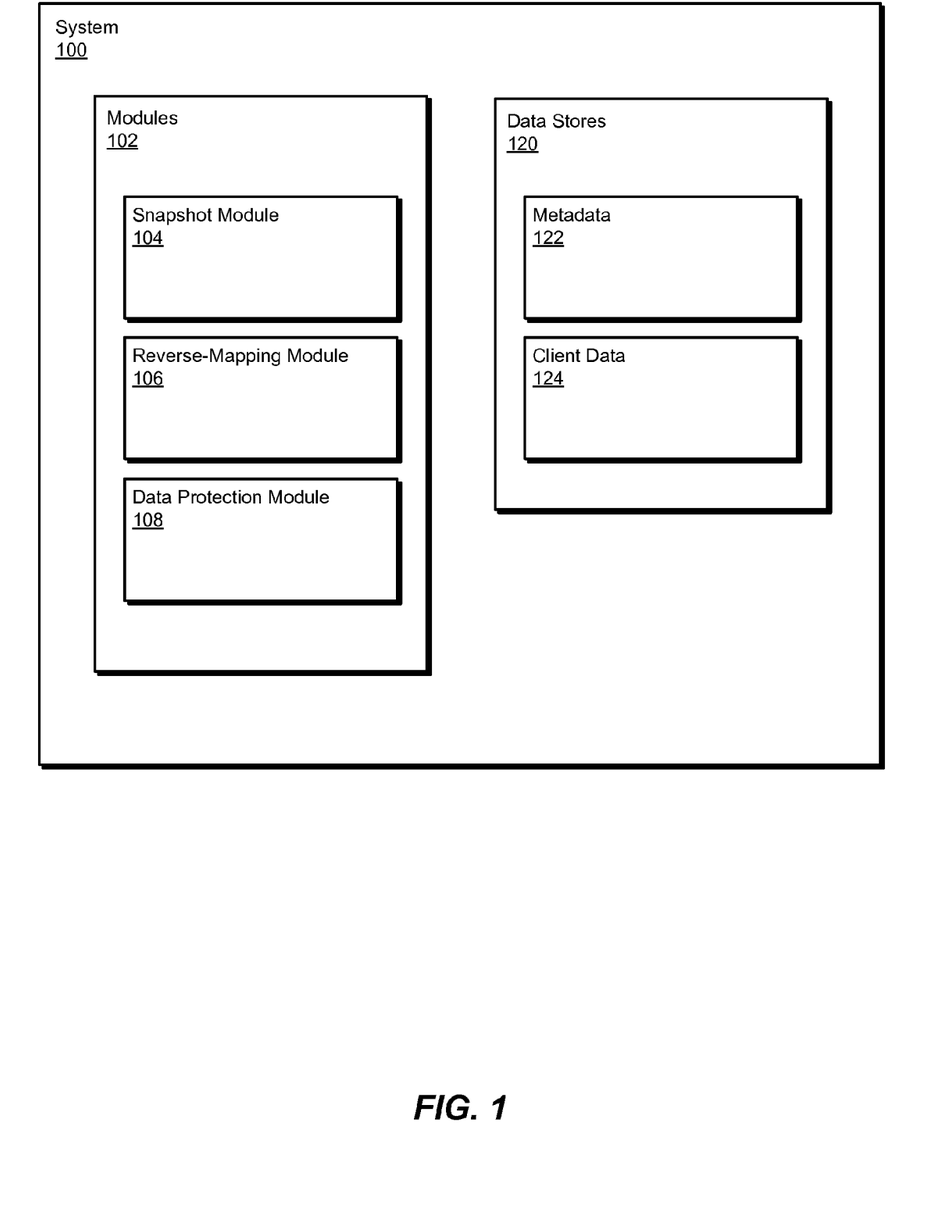
FIG. 1 is a block diagram of an exemplary system for providing data protection in object-based storage environments.

FIG. 1 is a block diagram of an exemplary system 100 for providing data protection in object-based storage environments. As illustrated in this figure, exemplary system 100 may include one or more modules 102 for performing one or more tasks. For example, and as will be explained in greater detail below, exemplary system 100 may include a snapshot module 104 programmed to take a first snapshot, at a first time, of a set of partitions that store data of a file system on a set of object storage devices. Snapshot module 104 may also be programmed to take a second snapshot, at a second time, of the set of partitions that store data of the file system on the set of object storage devices.

Exemplary system 100 may also include a reverse-mapping module 106 programmed to use information from the set of object storage devices to identify at least one object that changed between the first and second times. Reverse-mapping module 106 may also be programmed to use object identification information for the changed object to deduce file identification information that identifies a file that comprises the changed object.

In addition, and as will be described in greater detail below, exemplary system 100 may include a data protection module 108 programmed to use the first snapshot to sync the data of the file system with a data protection node and send the changed object and the file identification information to the data protection node. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., data protection system 260), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more data stores 120. Data stores 120 may represent portions of a single database or computing device or a plurality of databases or computing devices. In one embodiment, exemplary system 100 may include metadata 122 that includes metadata information associated with object storage devices. For example, metadata 122 may be part of a metadata server in an object-based storage system. Exemplary system may also include client data 124, which may be file system data that is stored within objects in an object-based storage system.

Data stores 120 in FIG. 1 may represent a portion of one or more computing devices. For example, data stores 120 may represent a portion of storage subsystem 250 and/or metadata server 270 in FIG. 2, computing system 510 in FIG. 5, and/or portions of exemplary network architecture 600 in FIG. 6. Alternatively, data stores 120 in FIG. 1 may represent one or more physically separate devices capable of being accessed by a computing device, such as storage subsystem 250 and/or metadata server 270 in FIG. 2, computing system 510 in FIG. 5, and/or portions of exemplary network architecture 600 in FIG. 6.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

Figure 2:
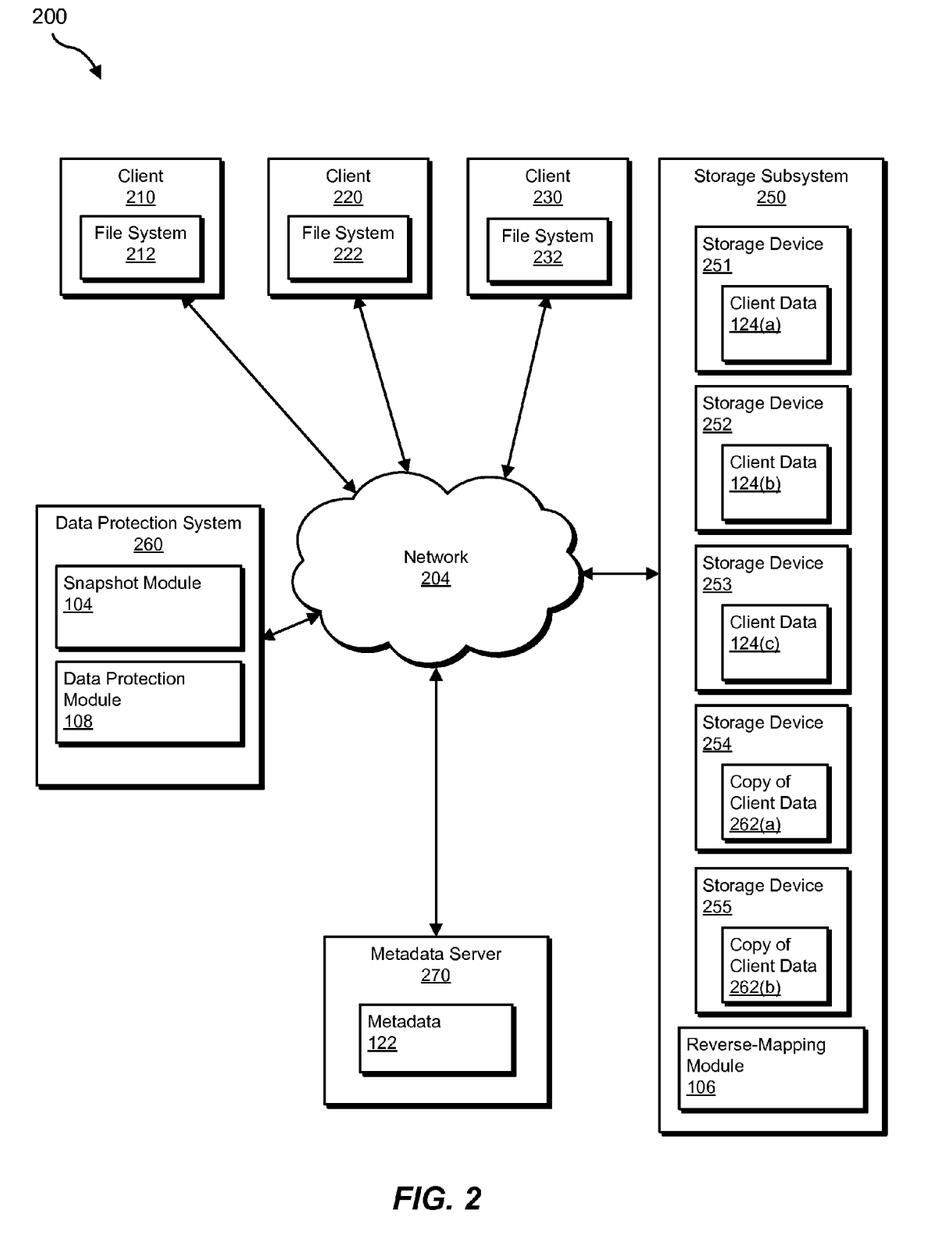
FIG. 2 is another block diagram of an exemplary system for providing data protection in object-based storage environments.

As shown in FIG. 2, system 200 may include clients 210, 220, and 230, a storage subsystem 250, a data protection system 260, and a metadata server 270 interconnected through a network 204. Although system 200 is described as including clients and servers, in alternative embodiments the functions performed by clients and servers may be performed by peers in a peer-to-peer configuration or by a combination of clients, servers, and peers.

As shown, clients 210, 220, and 230 may include file systems 212, 222, and 232, respectively. Clients 210, 220, and 230 generally represent any type or form of computing device capable of reading computer-executable instructions. File systems 212, 222, and 232 generally represent any type or form of system for organizing data in files. Examples of clients 210, 220, and 230 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

In alternative embodiments, the number and type of clients, servers, and storage devices is not limited to those shown in FIG. 1. Almost any number and combination of servers, desktop, and mobile clients may be interconnected in system 200 via various combinations of modem banks, direct LAN connections, wireless connections, WAN links, etc. Also, at various times one or more clients may operate offline. In addition, during operation, individual client connection types may change as mobile users travel from place to place connecting, disconnecting, and reconnecting to system 200. Within system 200, any of clients 210, 220, and 230 may store data within storage subsystem 250.

Storage subsystem 250 may include individual storage devices 251-255 and reverse-mapping module 106. Storage devices 251-255 may include any of a variety of devices such as hard disks, server blades, peer-to-peer storage servers, or specialized devices, and may include a variety of memory devices such as RAM, Flash RAM, MEMS (MicroElectro-Mechanical Systems) storage, battery-backed RAM, and/or non-volatile RAM (NVRAM), etc. In one embodiment, each storage device may be a separate computer. Then storage subsystem 250 may comprise separate individual computers 251-255. In another embodiment, each separate computer may be interconnected with other separate computers via network 204. Therefore, rather than storage subsystem 250 having an interface with network 204, each separate computer 251-255 may have an interface with network 204 in order to communicate with clients 210-230, other computers within subsystem 250, data protection system 260, or other devices.

Figure 3:
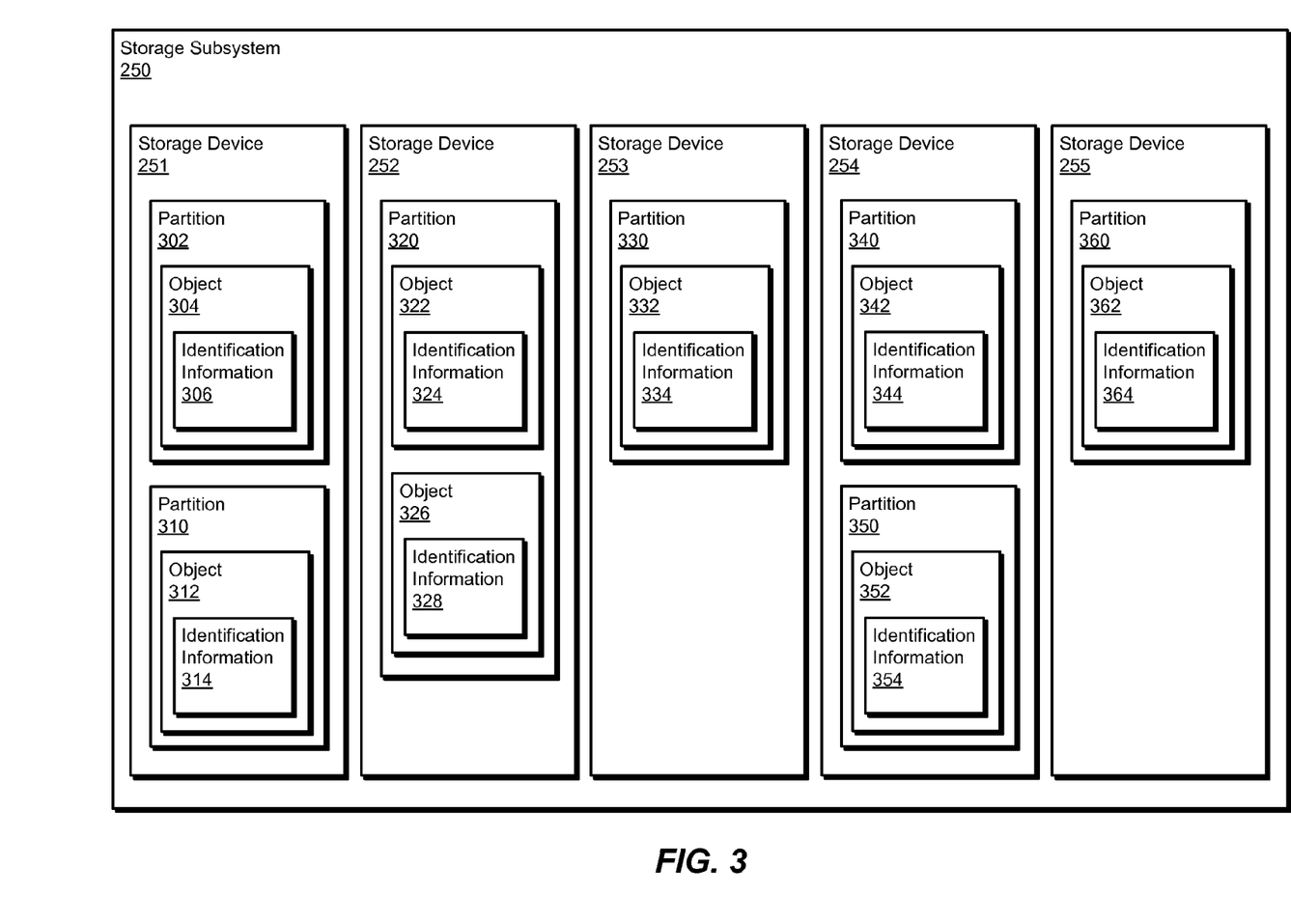
FIG. 3 is a block diagram of an exemplary set of object storage devices.

Client data 124 may be stored on one or more of storage devices 251-255. For example, storage device 251 may store client data 124(a), storage device 252 may store client data 124(b), storage device 253 may store client data 124(c), storage device 254 may store copy of client data 262(a), and storage device 255 may store copy of client data 262(b). Client data 124(a)-(c) and copy of client data 262(a)-(b) may be stored as objects on partitions of storage devices 251-255, as shown in FIG. 3. As used herein, the term "client data" generally refers to any type or form of data managed by a file system (e.g., file system 212, 222, and/or 232) on a client.

Client data may be stored within storage subsystem 250 in one of a variety of well-known layouts, such as RAID-1, RAID-DP, RAID-5, RAID-6, an erasure-coded data representation scheme, etc., in which the reliability of storage may be enhanced by redundancy and/or error correction capabilities. Metadata (e.g., metadata 122) associated with the layout of data stored in storage subsystem 250 may be stored in metadata server 270. A client may retrieve metadata from metadata server 270 in order to identify a desired data storage location within storage subsystem 250. Thus, in object-based storage systems, a client may access data in a two step process: 1) query a metadata server for the location of one or more objects that store the data of the file; and 2) use the location information from the metadata server to identify the file data on one or more object storage devices. In some embodiments, metadata associated with stored objects may also be stored on storage devices 251-255.

In some embodiments, client data may be stored in stripe units of a given size that depends on the capacity of individual storage device locations. These stripe units may be data objects that contain data portions, chunks, or any other segment of data suited to the individual storage devices. However, from the client view, data stripe units may be of a different size. For example, a client may convey data to a storage subsystem in stripe units of a size sufficient to fill a row across a number of storage devices arranged in an array. A client may also convey data in a size smaller than a stripe unit.

Data protection system 260 may provide one or more data protection services for data stored in storage subsystem 250. As shown, data protection system 260 may include snapshot module 104 and data protection module 108. Data protection system 260 may provide backup services, replication services, continuous data protection services, archiving services, and/or any other data protection services. As an example, data protection system 260 may replicate client data 124(a) and 124(b) to storage devices 254 and 255 as copy of client data 262(a) and copy of client data 262(b). Thus, storage devices 254 and 255 may be referred to as data protection nodes.

Clients 210-230, storage subsystem 250, data protection system 260, and metadata server 270 may communicate over network 204. Network 204 generally represents any medium or architecture capable of facilitating communication or data transfer. Examples of network 204 include, without limitation, an intranet, a wide area network, a local area network, a personal area network, the Internet, power line communications (PLC), a cellular network (e.g., a GSM Network), exemplary network architecture 600 in FIG. 6, or the like. Network 204 may facilitate communication or data transfer using wireless or wired connections.

FIG. 3 is a block diagram of an exemplary configuration of storage subsystem 250. The storage devices of storage subsystem 250 may be divided into any suitable number of partitions and may store any suitable number of objects. As shown, storage device 251 may include a partition 302 and a partition 310. Partition 302 may include an object 304 with identification information 306, and partition 310 may include an object 312 with identification information 314. Similarly, storage device 252 may include a partition 320 that includes an object 322 with identification information 324 and an object 326 with identification information 328. Storage device 253 may include a partition 330 with an object 332 and identification information 334.

Storage device 254 may include a partition 340 and a partition 350. Partition 340 may include an object 342 with identification information 344, and partition 350 may include an object 352 with identification information 354. Storage device 255 may include a partition 360 with an object 362 and identification information 364.

The partitions shown in FIG. 3 generally represent any type or size of disk partition. A disk may include one or more partitions of any suitable size. In object-based-storage environments, objects are stored within the partitions created on the object storage devices. As used herein, the term object generally refers to any storage entity (i.e., container) that stores data within an object storage device. Space for an object may be allocated by an object storage device rather than a client-side file system.

Objects may include client data and may also include identification information. For example, object identification information may include a 64-bit partition identifier and a 64-bit object identifier. In other words, objects locations may be expressed in terms of object identifiers and block ranges within objects rather than in terms of ranges of raw disk blocks. Object identification information may also include attribute information.

Figure 4:
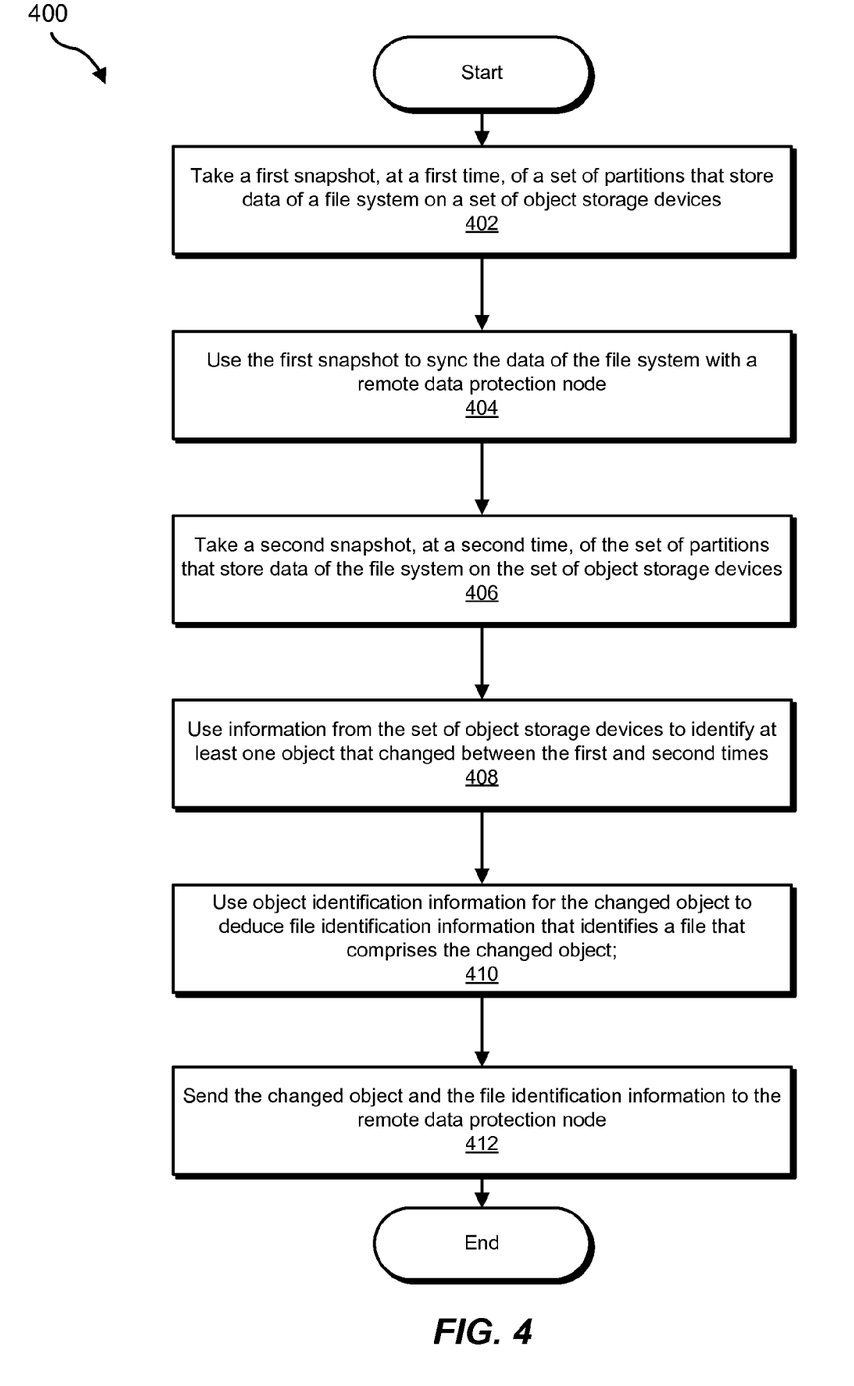
FIG. 4 is a flow diagram of an exemplary method for providing data protection in object-based storage environments.

FIG. 4 is a flow diagram of an exemplary computer-implemented method 400 for providing data protection in object-based-storage environments. The steps shown in FIG. 4 may be performed by any suitable computer-executable code and/or computing system. In some embodiments, the steps shown in FIG. 4 may be performed by one or more of the components of system 100 in FIG. 1 and/or system 200 in FIG. 2.

At step 402 in FIG. 4, one or more of the systems described herein may take a first snapshot, at a first time, of a set of partitions that store data of a file system on a set of object storage devices. In some embodiments, snapshot module 104 may take a snapshot of one or more partitions of object storage devices that store data for file system 212 of client 210. Snapshot module 104 may take such a snapshot in any suitable way and/or any suitable context. Snapshot module 104 may take the snapshot as part of a periodic data protection action and/or a scheduled data protection action. As an example, if partitions 302, 310, and 320 of storage devices 251 and 252 store data of file system 212, snapshot module 104 may take a snapshot of objects stored in these partitions (i.e., objects 304, 312, 322, and 326).

As used herein, the term "snapshot" generally refers to any representation of the data objects stored on an object storage device at a particular point in time. The snapshots discussed herein may be created using any suitable snapshot utility. For example, snapshots may be created using a split-mirror snapshot utility and/or any other snapshot utility.

At step 404 in FIG. 4, one or more of the systems described herein may use the first snapshot to sync the data of the file system with a data protection node. For example, data protection module 108 may use the snapshot created by snapshot module 104 to sync data of file system 212 with data protection system 260 by copying the data (e.g., the copied data may be copy of client data 262(*a*) and 262(*b*).

Data protection module 108 may use the first snapshot to perform one or more of a variety of data protection functions. For example, in some embodiments, data protection module 108 may use the snapshot to replicate data from storage subsystem 250. Data protection module 108 may also create backups of storage subsystem 250, provide continuous data protection for storage subsystem 250, archive data from storage subsystem 250, and/or may provide any other suitable data protection function for data from storage subsystem 250.

At step 406 in FIG. 4, one or more of the systems described herein may take a second snapshot, at a second time, of the set of partitions that store data of the file system on the set of object storage devices. Continuing with the previous example, snapshot module 104 may take a snapshot, at a second point in time, of the data associated with file system 212, which may be stored in storage devices 251 and 252 as objects 304, 312, 322, and 326.

Embodiments of the instant disclosure may not require clients to flush any data and/or metadata (e.g., cached data) at the time a snapshot is being taken. As a result, embodiments of the instant disclosure may eliminate the significant overhead costs associated with flushing data at the time a snapshot is taken.

At step 408, one or more of the systems described herein may use information from the set of object storage devices to identify at least one object that changed between the first and second times. For example, data protection module 108 may use information from object storage devices 251 and 252 to identify an object that changed between the time the first snapshot was taken and the time the second snapshot was taken.

Data protection module 108 may use any suitable information from object storage devices 251 and 252 to identify a changed object. For example, data protection module 108 may determine whether a timestamp of an object has changed between the first and second times. As an example, if a timestamp of object 312 indicates that object 312 was modified between the first and second times, data protection module 108 may determine that object 312 changed between the first and second times. Alternatively, data protection module 108 may identify change logs in each of storage devices 251 and 252. Data protection module 108 may use these change logs to identify one or more objects that changed between the time the first snapshot was taken and the time the second snapshot was taken.

By change tracking information from object storage devices instead of a metadata server, embodiments of the instant disclosure may not burden the metadata server. Furthermore, using tracking information from object storage devices distributes the resource load for performing data protection and may therefore be more efficient that using centralized change tracking.

At step 410 in FIG. 4, or more of the systems described herein may use object identification information for the changed object to deduce file identification information that identifies a file that comprises the changed object. For example, reverse-mapping module 106 may use object identification information for object 312 to deduce file identification information that identifies a file in file system 212 that is at least partially stored as object 312.

Reverse-mapping module 106 may use any suitable process to deduce file identification information that identifies a file that comprises a changed object. In some embodiments, the changed object may include object identification information that includes a partition identifier, an object identifier, and an attribute field. For example, identification information 314 of object 312 (i.e., the changed object in this example) may include a partition identifier that identifies partition 310, an object identifier that identifies object 312, and an attribute field that indicates one or more attributes of object 312. In some embodiments, the partition identifier may include file system identification information (e.g., an FSID) of object 312 that identifies file system 212. In one example, a predetermined number of bits of the partition identifier may be reserved for storing the file system identifier.

In some embodiments, a file system identifier may be used in generating a partition identifier. In such embodiments, the file system identifier may be determined by performing a reverse mapping operation on the partition identifier.

According to certain embodiments, the object identifier may identify the changed object and may include an inode number of a file that includes the object. For example, a predetermined number of bits of the object identifier may be reserved for storing the inode number of the associated file. Similarly, the attribute field of an object may include offset information that identifies the changed object's offset within the file. Thus, by inspecting and/or manipulating an object's partition identifier, object identifier, and/or attributes, reverse-mapping module 106 may reverse map the object to a file whose data is stored in the object.

In other embodiments, rather than using information stored with the object's identification information, reverse-mapping module 106 may read a table that maps the object information to the file identification information to identify a file associated with the object. Reverse-mapping module 106 may read any type of table or other information to identify a file that is associated with an object (i.e., a file for which the object stores data).

At step 412 in FIG. 4, one or more of the systems described herein may send the changed object and the file identification information to the data protection node. For example, data protection module 108 may send object 312 from storage subsystem 250 to data protection system 260. Data protection system 260 may use object 312 for one or more data protection functions. For example, object 312 may be used to update a copy of file system 212 on data protection system 260.

Data of an object-based storage system may be backed up or replicated to a remote storage device in any suitable manner. For example, as previously discussed, changed data may be replicated into a copy of a file system. In other embodiments, changed data may be replicated into an object-based storage environment and/or any other suitable storage environment.

In some embodiments, data protection module 108 may retrieve namespace metadata of file system 212 (i.e., the file system being replicated or backed up) from metadata server 270. Data protection module 108 may use the metadata to identify changes made to the namespace of file system 212 between the first and second times (i.e., between the first and second snapshots). For example, data protection module 108 may use the metadata to identify changes made to the namespace by using a file change log in the metadata to identify changes made to the namespace.

Additionally or alternatively, data protection module 108 may use the metadata to identify changes made to the namespace by mounting the first and second snapshots. Data protection module 108 may then perform a namespace traversal of the first snapshot to provide a representation of the namespace at the first time and may perform a namespace traversal of the second snapshot to provide a representation of the namespace at the second time. Data protection module 108 may then compare the representation of the namespace at the first time with the representation of the namespace at the second time to identify changes made to the namespace.

In some embodiments, data protection module 108 may retrieve metadata for the set of object storage devices from a set of metadata servers and may determine that the metadata has not been updated to reflect the change to the changed object. For example, client 210 may change object 312 in storage subsystem 250 but may not provide metadata server 270 with an update that reflects this change before the second snapshot is taken. In such embodiments, data protection module 108 may wait for the metadata to be updated on metadata server 270 before applying changed object 312 to a file system on data protection system 260.

According to various embodiments, files of one or more of the file systems described herein may be two-way mirrored. In such embodiments, mirroring information of the files may be stored with the object identification information in an object. This mirroring information may be used to prevent duplication of data protection operations on the file.

Figure 5:
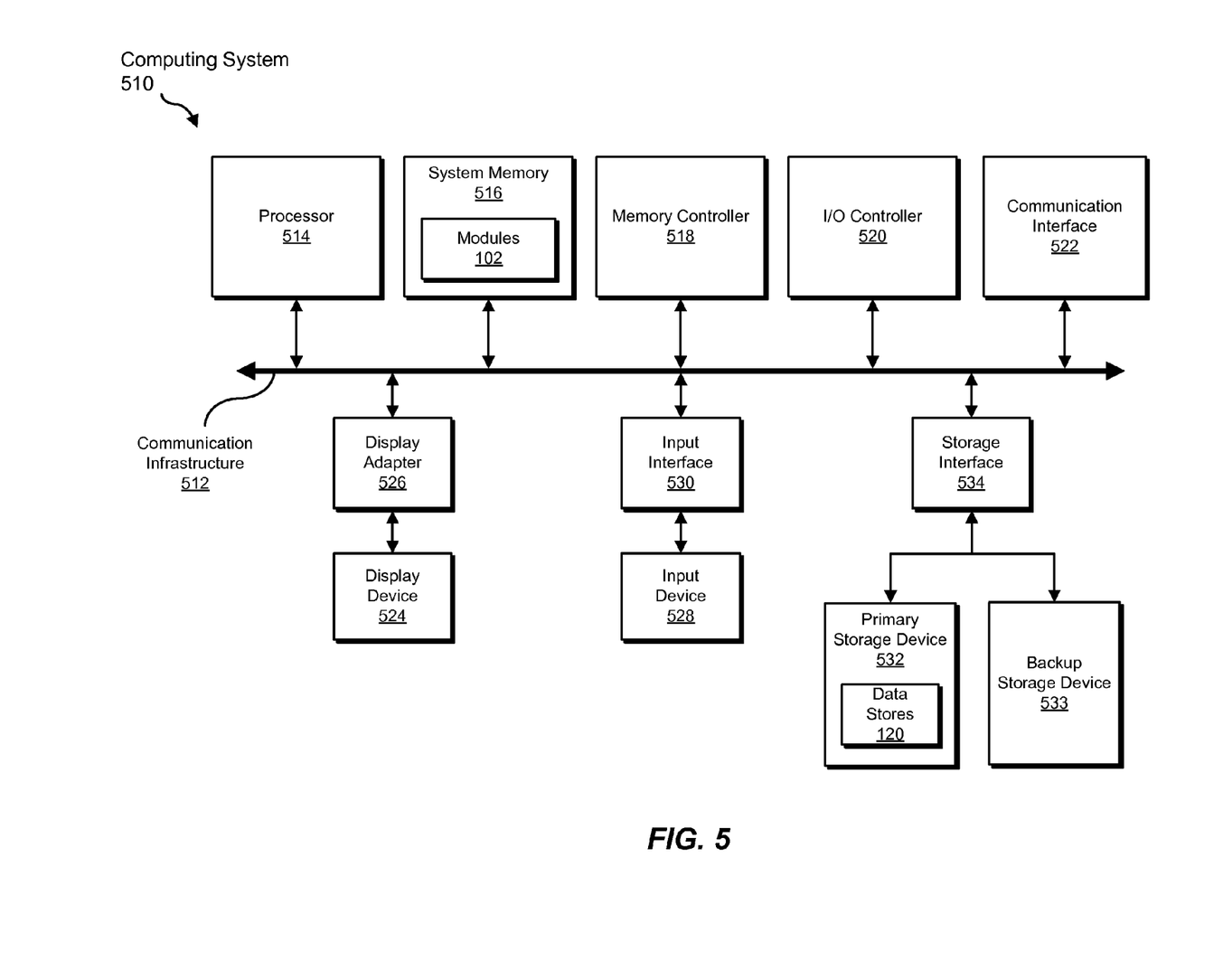
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the taking, using, sending, retrieving, determining, waiting, mounting, performing, comparing, identifying, applying, replicating, and/or reading steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller may perform and/or be a means for performing, either alone or in combination with other elements, one or more of the steps or features described and/or illustrated herein, such as taking, using, sending, retrieving, determining, waiting, mounting, performing, comparing, identifying, applying, replicating, and/or reading.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the taking, using, sending, retrieving, determining, waiting, mounting, performing, comparing, identifying, applying, replicating, and/or reading steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the taking, using, sending, retrieving, determining, waiting, mounting, performing, comparing, identifying, applying, replicating, and/or reading steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the taking, using, sending, retrieving, determining, waiting, mounting, performing, comparing, identifying, applying, replicating, and/or reading steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, data stores 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the taking, using, sending, retrieving, determining, waiting, mounting, performing, comparing, identifying, applying, replicating, and/or reading steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
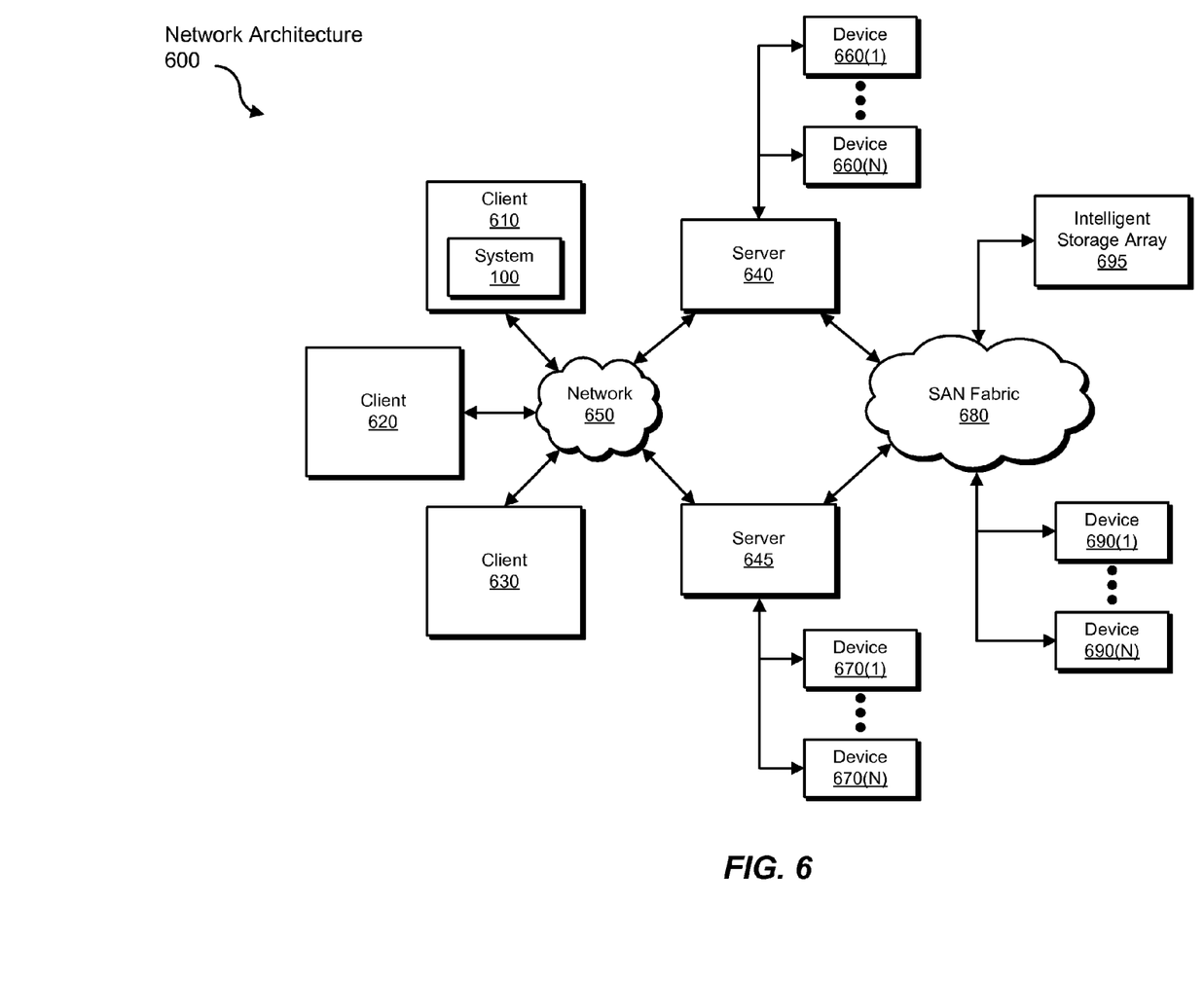
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the taking, using, sending, retrieving, determining, waiting, mounting, performing, comparing, identifying, applying, replicating, and/or reading steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for providing data protection in object-based storage environments.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules herein may convert a storage device into an object storage system backup or replication by backing up or replicating objects to the storage device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for providing data protection in object-based storage environments, at least a portion of the method being performed by a computing device comprising at least one processor, the method comprising:
    taking a first snapshot, at a first time, of a set of partitions that store data managed by file system on a set of object storage devices, the set of object storage devices comprising a plurality of storage devices;
    using the first snapshot to sync the data managed by the file system with a data protection node;
    taking a second snapshot, at a second time, of the set of partitions that store data managed by the file system on the set of object storage devices;
    distributing, among the plurality of storage devices, a resource load for performing data protection by, for each storage device in the plurality of storage devices, identifying change-tracking information stored in the storage device instead of using centralized change-tracking information from a metadata server to identify at least one object that changed between the first and second times;
    identifying object identification information comprising:
        a partition identifier that identifies a partition of the changed object and comprises file system identification information that identifies the file system that manages the data that includes the changed object;
        an object identifier that identifies the changed object and comprises an inode number of a file that includes the changed object on the data protection node;
        an attribute field that includes offset information that identifies the changed object's offset within the file;
    using the object identification information for the changed object to deduce file identification information that identifies the file on the data protection node by reading the file system identification information, the inode number, and the offset from the object identification information;
    sending the changed object and the file identification information to the data protection node in order to update the file on the data protection node.

2. The method of claim 1, further comprising:
    retrieving metadata for the set of object storage devices from a set of metadata servers;
    determining that the metadata has not been updated to reflect the change to the changed object;
    waiting for the metadata to be updated to reflect the change to the changed object before applying the changed object to a file system on the data protection node.

3. The method of claim 1, further comprising:
    retrieving namespace metadata of the file system;
    using the metadata to identify changes made to the namespace of the file system between the first and second times.

4. The method of claim 3, wherein using the metadata to identify changes made to the namespace comprises:
    using a file change log in the metadata to identify changes made to the namespace.

5. The method of claim 3, wherein using the metadata to identify changes made to the namespace comprises:
    mounting the first and second snapshots;
    performing namespace traversal of the first snapshot to provide a representation of the namespace at the first time;
    performing namespace traversal of the second snapshot to provide a representation of the namespace at the second time;
    comparing the representation of the namespace at the first time with the representation of the namespace at the second time to identify changes made to the namespace.

6. The method of claim 1, wherein identifying the change-tracking information stored in the storage device to identify the changed object comprises:
    determining whether a timestamp of the object changed between the first and second times.

7. The method of claim 1, wherein identifying the change-tracking information stored in the storage device to identify the changed object comprises:
    identifying a change log for each object storage device in the set of object storage devices;
    determining that the change log identifies the changed object.

8. The method of claim 1, wherein using the object identification information for the changed object to deduce file identification information comprises:
    reading a table that maps the object identification information to the file identification information.

9. The method of claim 1, wherein:
    the file is two-way mirrored;
    mirroring information for the file is stored with the object identification information;
    the mirroring information is used to prevent duplication of a data operation on the file.

10. The method of claim 1, wherein:
    the data protection node comprises a data-replication node;

sending the changed object and the file identification information to the data protection node comprises replicating the data in a file system on the data protection node.

11. The method of claim 1, wherein using the object identification information for the changed object to deduce file identification information comprises reverse mapping the changed object to a file that includes the changed object on the data protection node.

12. The method of claim 1, wherein:
taking the first snapshot of the sets of partitions that store data managed by the file system on the set of object storage devices comprises taking the first snapshot of the set of partitions at the first time without flushing cached data to the set of partitions at the first time;
taking the second snapshot of the sets of partitions that store data managed by the file system on the set of object storage devices comprises taking the second snapshot of the set of partitions at the second time without flushing cached data to the set of partitions at the second time.

13. A system for data protection in object-based storage environments, the system comprising:
a snapshot module programmed to:
take a first snapshot, at a first time, of a set of partitions that store data managed by a file system on a set of object storage devices, the set of object storage devices comprising a plurality of storage devices;
take a second snapshot, at a second time, of the set of partitions that store data managed by the file system on the set of object storage devices;
a reverse-mapping module programmed to:
distribute, among the plurality of storage devices, a resource load for performing data protection by, for each storage device in the plurality of storage devices, identifying change-tracking information stored in the storage device instead of using centralized change-tracking information from a metadata server to identify at least one object that changed between the first and second times;
identify object identification information comprising:
a partition identifier that identifies a partition of the changed object and comprises file system identification information that identifies the file system that manages the data that includes the changed object;
an object identifier that identifies the changed object and comprises an inode number of a file that includes the changed object on a data protection node;
an attribute field that includes offset information that identifies the changed object's offset within the file;
use the object identification information for the changed object to deduce file identification information that identifies the file on the data protection node by reading the file system identification information, the inode number, and the offset from the object identification information;
a data protection module programmed to:
use the first snapshot to sync the data managed by the file system with the data protection node;
send the changed object and the file identification information to the data protection node in order to update the file on the data protection node;
at least one processor configured to execute the snapshot module, the reverse-mapping module, and the data protection module.

14. The system of claim 13, wherein the data protection module is further programmed to:
retrieve metadata for the set of object storage devices from a set of metadata servers;
determine that the metadata has not been updated to reflect the change to the changed object;
wait for the metadata to be updated to reflect the change to the changed object before applying the changed object to a file system on the data protection node.

15. The system of claim 13, wherein the data protection module is further programmed to:
retrieve namespace metadata of the file system;
use the metadata to identify changes made to the namespace of the file system between the first and second times.

16. The system of claim 15, wherein the data protection module uses the metadata to identify changes made to the namespace by:
using a file change log in the metadata to identify changes made to the namespace.

17. The system of claim 15, wherein the data protection module uses the metadata to identify changes made to the namespace by:
mounting the first and second snapshots;
performing namespace traversal of the first snapshot to provide a representation of the namespace at the first time;
performing namespace traversal of the second snapshot to provide a representation of the namespace at the second time;
comparing the representation of the namespace at the first time with the representation of the namespace at the second time to identify changes made to the namespace.

18. The system of claim 13, wherein the reverse-mapping module is programmed to identify the change-tracking information stored in the storage device to identify the changed object by:
determining whether a timestamp of the object changed between the first and second times.

19. The system of claim 13, wherein the reverse-mapping module is programmed to identify the change-tracking information stored in the storage device to identify the changed object by:
identifying a change log for each object storage device in the set of object storage devices;
determining that the change log identifies the changed object.

20. A non-transitory computer-readable-storage medium comprising one or more computer-executable instructions that, when executed by at least one processor of a computing device, cause the computing device to:
take a first snapshot, at a first time, of a set of partitions that store data managed by a file system on a set of object storage devices, the set of object storage devices comprising a plurality of storage devices;
use the first snapshot to sync the data managed by the file system with a data protection node;
take a second snapshot, at a second time, of the set of partitions that store data managed by the file system on the set of object storage devices;
distribute, among the plurality of storage devices, a resource load for performing data protection by, for each storage device in the plurality of storage devices, identifying change-tracking information stored in the storage device instead of using centralized change-tracking information from a metadata server to identify at least one object that changed between the first and second times;
identify object identification information comprising:
  a partition identifier that identifies a partition of the changed object and comprises file system identification information that identifies the file system that manages the data that includes the changed object;
  an object identifier that identifies the changed object and comprises an inode number of a file that includes the changed object on the data protection node;
  an attribute field that includes offset information that identifies the changed object's offset within the file;
use the object identification information for the changed object to deduce file identification information that identifies the file on the data protection node by reading the file system identification information, the inode number, and the offset from the object identification information;
send the changed object and the file identification information to the data protection node in order to update the file on the data protection node.

\* \* \* \* \*